United States Patent
Waletzky et al.

[19]

[11] Patent Number: 6,134,184

[45] Date of Patent: *Oct. 17, 2000

[54] APPARATUS AND METHOD FOR CHASING ANIMALS FROM AN AUTOMOBILE

[75] Inventors: Lucy Waletzky, Pleasantville; Peter J. Wilk, New York, both of N.Y.

[73] Assignee: Wilk Patent Development Corporation, New York, N.Y.

[ * ] Notice: This patent is subject to a terminal disclaimer.

[21] Appl. No.: 09/132,610

[22] Filed: Aug. 11, 1998

Related U.S. Application Data

[63] Continuation-in-part of application No. 08/783,826, Jan. 13, 1997, Pat. No. 5,793,706.

[51] Int. Cl.[7] ............................ G10K 11/00; B60R 25/00
[52] U.S. Cl. ......................... 367/139; 116/224; 180/287
[58] Field of Search .............................. 367/139; 43/124; 116/224; 180/287

[56] References Cited

U.S. PATENT DOCUMENTS

| | | | |
|---|---|---|---|
| 4,413,261 | 11/1983 | Greenberg | 340/825.72 |
| 4,933,918 | 6/1990 | Landsrath et al. | 367/139 |
| 5,134,392 | 7/1992 | Takeuchi et al. | 340/825.69 |
| 5,793,706 | 8/1998 | Waletzky et al. | 367/139 |

FOREIGN PATENT DOCUMENTS 3922156  1/1991  Germany .

*Primary Examiner*—Ian J. Lobo
*Attorney, Agent, or Firm*—R. Neil Sudol; Henry D. Coleman

[57] ABSTRACT

An apparatus for chasing animals from an automobile includes a generator for producing energy which can be sensed by animals, means for mounting the generator to an automobile, and an activation device operatively connected to the generator for activating the generator upon detecting presence of an animal near the automobile. The activation device may include a motion sensor or an infrared sensor. The motion detector may take the form of an ultrasonic sensor, which is sensitive to vibrations in an ultrasonic frequency range.

18 Claims, 1 Drawing Sheet

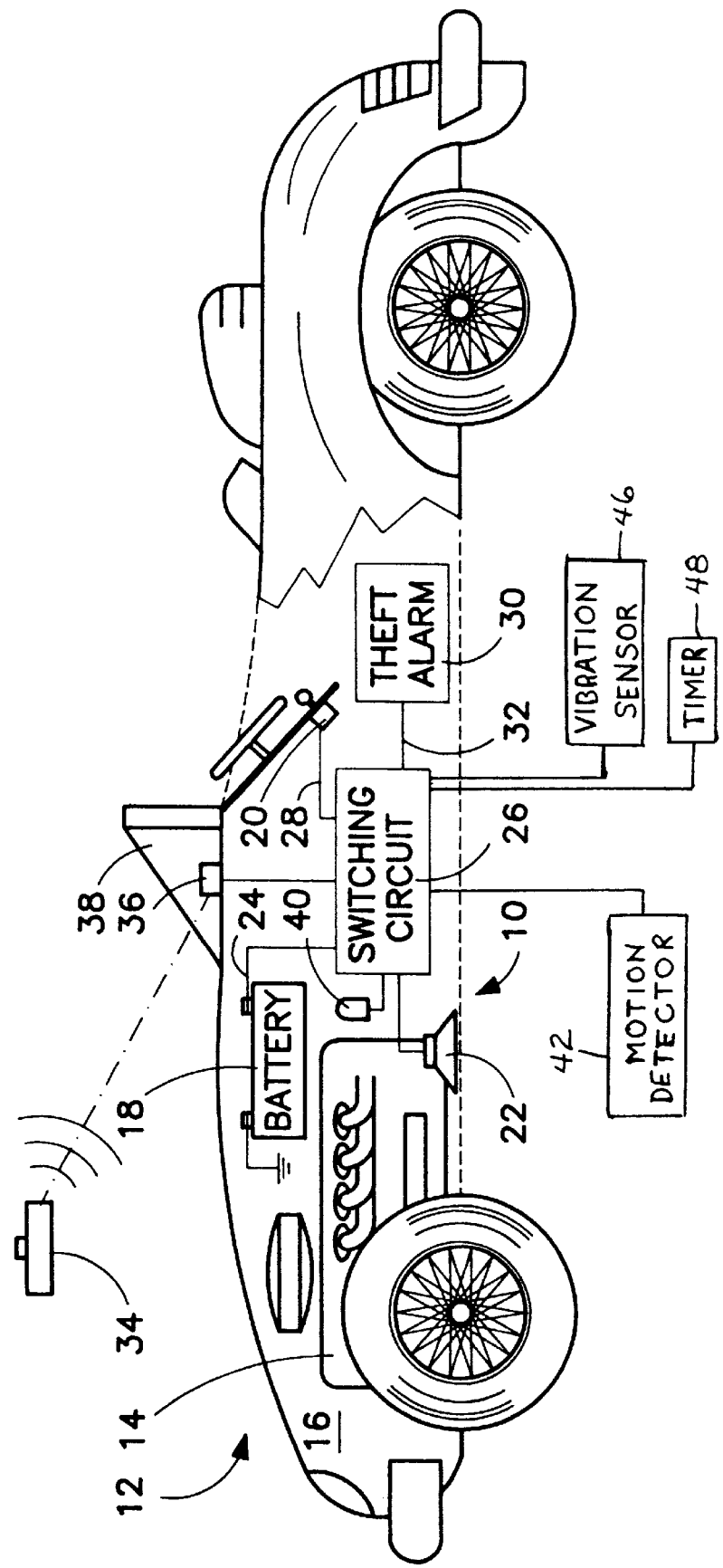

APPARATUS AND METHOD FOR CHASING ANIMALS FROM AN AUTOMOBILE

This application is a continuation-in-part of application Ser. No. 08/783,826 filed Jan. 13, 1997, now U.S. Pat. No. 5,793,706.

BACKGROUND OF THE INVENTION

This invention relates to an apparatus for inducing the departure of animals from the engine compartment and from about the engine compartment of automotive vehicles. This invention additionally relates to an associated method for scaring or chasing animals from automotive vehicles, particularly parked vehicles. The invention has the purpose and effect of preventing animals such as rodents from damaging automobile components. The invention also serves to prevent animals from being injured by an automobile in certain cases.

The sheltered warmth of an automobile engine compartment can be enticing to small animals seeking refuge against cold, rain, wind, or snow. The warm block of engine metal retains its heat for hours after a car has been driven, and the complex topography of the engine offers a variety of nesting places for a rodent. When the engine is started, the rodent may be injured or even killed. A rotting carcass in the engine compartment can introduce an unpleasant odor in the passenger compartment. Moreover, the car itself can suffer the wear of fine and powerful rodent incisors, nipping on wires and hoses crucial to the operation and safety of the vehicle.

Numerous schemes have been devised to divert unwanted pests from man's territory. In one technique, a generator of ultrasonic energy waves is provided in the home. The vibrations, silent to humans but painfully shrill to rodents, humanely force the flight of the pests. Nevertheless, an animal chased from a house is an animal more likely to seek refuge within a parked vehicle.

Little has been done to avert the damaging consequences of the incompatibility of cars and rodents. For those who care about the lives of the smallest of mammals, or who would not wish to find themselves stranded in an automobile incapacitated by the nighttime gnawing of resident rodents, a need exists to protect cars from rodents and rodents from cars.

OBJECTS OF THE INVENTION

It is an object of the invention to provide a system for averting rodent damage to automobiles, particularly to automobile components in engine compartments It is a further object of the invention to provide a system for preventing injury to small animals, particularly by automobile components in engine compartments.

In particular, it is an object of the invention to provide a system for chasing small animals from the vicinity of a car.

These and other objects of the present invention will be apparent from the drawings and detailed descriptions herein.

SUMMARY OF THE INVENTION

An apparatus for inducing the departure of animal intruders from a vicinity about an automotive engine comprises, in accordance with the present invention, a generator for producing energy of a form, duration and intensity which can be sensed by animals, means for mounting the generator to an automobile, and an activation device operatively connected to the generator for activating the generator upon detecting presence of an animal near the automobile. The activation device may include a motion sensor or an infrared sensor. The motion detector may take the form of an ultrasonic sensor, which is sensitive to vibration in an ultrasonic frequency range.

Preferably, the generator is an ultrasonic waveform generator. Alternatively or additionally the generator may include an audible sound generator.

In accordance with another feature of the present invention, a timer is operatively connected to the generator for deactivating the generator after lapse of a predetermined time period commencing with activation of the generator by the activation device.

A related method for chasing animals from an automobile comprises in accordance with the present invention, steps of maintaining an energy generator on an automobile in a deactivated state during operation of the automobile, automatically monitoring space in an about an engine compartment of the automobile after termination of operation of the automobile to determine whether an animal is present in the space, and automatically activating the generator, upon detecting presence of an animal in the space after termination of operation of the automobile, to produce energy to induce departure of the animal from the space.

The method further comprises the step of maintaining the generator in the deactivated state after termination of operation of the automobile and prior to detection of presence of the animal in the space.

In accordance with another feature of the present invention, the method includes the additional step of automatically deactivating the generator after lapse of a predetermined period after commencement of activation of the generator.

Where the automobile includes an ignition, the method may further comprise the steps of disabling activation of the generator in response to actuation of the ignition and enabling activation of the generator in response to a subsequent turning off of the ignition.

Where the automobile includes an anti-theft alarm, the method may additionally comprise the steps of enabling activation of the generator in response to activation of the anti-theft alarm and disabling activation of the generator in response to a deactivation of the anti-theft A method or apparatus according to the present invention causes animals to flee from the vicinity of an engine compartment and accordingly reduces the risk of harm coming to the animals and to the engine components.

BRIEF DESCRIPTION OF THE DRAWINGS

A sole FIGURE is a schematic illustration of an automobile including an apparatus for chasing animals in accordance with the present invention.

DETAILED DESCRIPTION OF THE INVENTION

An apparatus 10 for chasing away animals such as rodents is mounted on an automobile 12. Automobile 12 includes conventional automobile elements such as an engine 14 mounted in an engine compartment 16, an automobile battery 18, and an ignition switch 20. The term "automobile" is used herein to include cars, trucks, vans, buses, minivans, ATVs, RVs, and related forms of ground transport.

Animal-chasing apparatus 10 includes a vibration generator 22. Vibration generator 22 is mounted on automobile 12, preferably in engine compartment 16, and is powered through a power lead 24 by automotive battery 18. Current supplied to vibration generator 22 through power lead 24 is switched by a switching circuit 26. Switching circuit 26 is operative to switch the generator between an activated state, in which current is supplied to generator 22 so that generator 22 generates vibrations, and a deactivated state, in which current is cut off from generator 22, so that generator 22 does not generate vibrations.

Vibrations are generated by generator 22 at one or more amplitudes and frequencies which can be sensed by animals and which repel animals. For example, generator 22 may be a speaker generating ultrasonic, audible (i.e. audible to humans), or subsonic pressure waves through the air and/or the structural material of automobiles 12. Examples of audible pressure waves emitted by generator 22 include recordings of or synthesized sounds imitating humans, birds, and other creatures which pose a threat to the life of rodents. Upon hearing such noises, a rodent seeking shelter in engine compartment 16 or elsewhere in automobile 12 will believe itself threatened by one of these creatures and will flee the vicinity of animal-chasing apparatus 10.

Subsonic vibrations from vibration generator 22 may be produced by an oscillating electromagnetic actuator, an eccentric rotor, or other electromechanical means to shake automobile 12 with low-frequency vibrations which elicit fear in animals and lead to the escape.

It is well known that ultrasonic vibrations are unpleasant to rodents. Where it is desirable to chase away rodents with ultrasonic vibrations, vibration generator 22 may include a piezoelectric transducer for the generation of ultrasonic pressure waves.

Switching circuit 26 may include an ignition sensor lead 28 attached to ignition switch 20. Switching circuit 26 defects through ignition sensor lead 28 whether ignition switch 20 is on or off. Ignition switch 20, battery 18, and engine 14 are wired together in a conventional manner. When switching circuit 26 detects that ignition switch 20 is in the off position, switching circuit 26 activates vibration generator 22. Conversely, when switching circuit 26 detects the ignition switch 20 is in the on position, switching circuit 26 deactivates vibration generator 22. When automobile 12 is in a parked state, ignition switch 20 is in the off position in accordance with standard automobile driving procedure, and vibration generator 22 is active to scare away animals. When automobile 12 is in a driving state, ignition 20 is in the on position in accordance with standard automobile driving procedure, and vibration generator 22 is deactivated. Because animals are only likely to seek refuge in automobile 12 while the latter is in a parked state, the connection of switching circuit 26 with ignition switch 20 automatically ensures that vibration generator 22 is activated only when it is most needed, in the parked state.

In an alternative system for automatically activating vibration generator 22 while automobile 12 is in a parked state, automobile 12 is provided with an anti-theft alarm 30. Switching circuit 26 includes an alarm detection lead 32 attached to anti-theft alarm 30. When alarm 30 is activated, switching circuit 26 activates vibration generator 22. When alarm 30 is deactivated, switching circuit 26 deactivates vibration generator 22. Automobile anti-theft alarm 30 is activated only when automobile 12 is in a parked state. Accordingly, vibration generator 22 is likewise activated only when automobile 12 is in a parked state.

In addition to automatic control of animal-chasing apparatus 10, manual control of switching circuit 26 may be provided, for example by means of a wireless remote control transmitter 34 and complementary receiver 36. Transmitter 34 and receiver 36 may communicate following any conventional remote control protocol using radio or infrared signals. Receiver 36 is preferably positioned near a windshield 38 or other window of automobile 12 because of enhanced transparency to infrared and radio signals.

In addition to or as an alternative to vibration generator 22, a light source of varying intensity, for example a strobe light such as a xenon flash tube 40, may be provided to frighten rodents or other animals in the engine compartment and cause them to flee. Strobe light 40 is wired to switching circuit 26 to be activated and deactivated as described above with respect to vibration generator 22. Strobe 40, when activated, periodically emits flashes of light.

A sensor 42 may be mounted to automobile 12, for example, in engine compartment 16 for monitoring a space about engine 14 including engine compartment 16 and optionally an area below compartment 16 for the presence of animals. Sensor 42 may take the form of a motion sensor or an infrared sensor. In the latter case, the sensor is aimed away from engine 14, for example, towards a ground surface beneath the car, to obviate interference by heat provided by the engine. Sensor 42 is operatively connected to generator 22, for example, via switching circuit 26, for activating the vibration generator upon detecting presence of an animal in the space about engine 14.

Typically, the operation of sensor 42 to effect activation of generator 22 is disabled during operation of the automobile. This disabling may be implemented by circuit 26 in response to signals from ignition switch 20 and/or anti-theft alarm 26. Alternatively, a vibration sensor 46 may be placed in operative contact with automobile 12 for sensing a running of the automobile. Sensor 46 is connected to switching circuit 26 (and accordingly to generator 22 and sensor 42) for disabling the activation of generator 22 by sensor 42 while automobile 12 is running.

A timer 48 is connected to generator 22, via switching circuit 26, for automatically terminating activation of the generator after the lapse of a predetermined period following the commencement of signal generation.

It is to be noted that the alternating enablement and disablement of generator function may be accomplished by a manual switch (not shown). The switch may be provided in the passenger compartment of the vehicle and connected to generator 22 or switching circuit 26 by wires or a wireless radio or ultrasonic link. Alternatively, the switch may be provided on a transportable casing to be activated and deactivated by the vehicle operator in the current manner of door locks and anti-theft alarms. Of course, in the latter case, the connection to generator 22 or switching circuit 26 is by a wireless link.

Although the invention has been described in terms of particular embodiments and applications, one of ordinary skill in the art, in light of this teaching, can generate additional embodiments and modifications without departing from the spirit of or exceeding the scope of the claimed invention. For example, as discussed hereinabove, energy of different forms may be generated for purposes of inducing the departure of animals from a vicinity about an automotive engine. Such energy forms include sonic or ultrasonic pressure waves (noise), subsonic pressure waves (vibration), electromagnetic energy (strobe light or flash), chemical energy (e.g., pepper spray), and mechanical energy (e.g., jets of gas or liquid).

In some cases, such as water jets or pepper spray, the energy must be directed towards the intruder. In that case, a mechanism may be provided for automatically directing a gun or nozzle towards the intruder. The locations of the intruder is easily determined from the sensing input. A microprocessor controls a servomechanism for oriented the gun or nozzle in an appropriate direction.

In another variant of the invention, the presence of an intruder in or about the engine compartment of an automotive vehicle is detected by a video sensor (CCD camera) and pattern recognition circuitry. Ancillary devices such as recording equipment and indicator displays may be provided, for example, in the passenger compartment.

Accordingly, it is to be understood that the drawings and descriptions herein are proffered by way of example to facilitate comprehensive of the invention and should not be construed to limit the scope thereof.

What is claimed is:

1. An apparatus for inducing a departure of animals from a vicinity about an automotive engine, comprising:

a generator for generating energy which can be sensed by animals;

means for mounting said generator to an automobile containing the engine; and activation means operatively connected to said generator for detecting presence of an animal near said automobile and activating said generator upon detecting presence of such animal near said automobile.

2. The apparatus defined in claim 1 wherein said activation means includes a motion sensor.

3. The apparatus defined in claim 1 wherein said activation means includes an infrared sensor.

4. The apparatus defined in claim 1 wherein said activation means includes a vibrator sensor.

5. The apparatus defined in claim 1 wherein said generator is an ultrasonic pressure wave generator.

6. The apparatus defined in claim 1 wherein said generator is an audible sound generator.

7. The apparatus defined in claim 1 further comprising a timer operatively connected to said generator for deactivating said generator after lapse of a predetermined time period commencing with activation of said generator by said activation means.

8. A method for inducing departure of animals from a vicinity about an automobile engine, comprising:

providing, on an automobile, a generator of energy which can be sensed by animals;

maintaining said generator in a deactivated state during operation of said automobile;

after termination of operation of said automobile, automatically monitoring space in and about an engine compartment of said automobile to determine whether an animal is present in said space, and upon detecting presence of an animal in said space after termination of operation of said automobile, automatically activating said generator to produce said energy to induce departure of said animal from said space.

9. The method defined in claim 8, further comprising the step of maintaining said generator in the deactivated state after termination of operation of said automobile and prior to detection of presence of said animal in said space.

10. The method defined in claim 8, further comprising the step of automatically deactivating said generator after lapse of a predetermined period after commencement of activation of said generator.

11. The method of claim 8 wherein said automobile includes an ignition, further comprising the steps of disabling activation of said generator in response to actuation of said ignition and enabling activation of said generator in response to a subsequent turning off of said ignition.

12. The method of claim 8 wherein said automobile includes an anti-theft alarm, further comprising the steps of enabling activation of said generator in response to activation of said anti-theft alarm and disabling activation of said generator in response to a deactivation of said anti-theft alarm.

13. The method of claim 8 wherein said generator is an ultrasonic pressure wave generator.

14. The method of claim 8 wherein said generator is an audible sound generator.

15. An apparatus for inducing a departure of animals from a vicinity about an automotive engine in an automobile, comprising:

a generator for generating energy which can be sensed only by animals;

means for mounting said generator to an automobile containing the engine; and activation means operatively connected to said generator for enabling operation of said generator essentially only during time periods that said engine of said automobile is turned off.

16. The apparatus of claim 15 wherein said activation means includes a circuit operatively connectable to an ignition of said automobile.

17. The apparatus of claim 15 wherein said activation means includes a circuit operatively connectable to an anti-theft alarm system of said automobile.

18. The apparatus of claim 15 wherein said activation means is operatively connected to said generator for energizing said generator to emit said energy essentially continually during time periods that said engine of said automobile is turned off.

* * * * *